(12) United States Patent
Ellyin et al.

(10) Patent No.: US 6,354,334 B1
(45) Date of Patent: Mar. 12, 2002

(54) FIBER-REINFORCED COMPOSITE WRAPPED STEEL LINER

(76) Inventors: Fernand Ellyin, 1104, 11007-83 Avenue, Edmonton, Alberta (CA), T2G 0T9; Zihui Xia, 8323-82 Avenue, Edmonton, Alberta (CA), T6C 0Y5

( * ) Notice: Subject to any disclaimer, the term of this patent is extended or adjusted under 35 U.S.C. 154(b) by 0 days.

(21) Appl. No.: 09/514,349

(22) Filed: Feb. 28, 2000

(51) Int. Cl.[7] .................................................. F16L 9/04
(52) U.S. Cl. .................. 138/143; 138/172; 138/DIG. 2; 138/DIG. 5
(58) Field of Search ................................. 138/172, 143, 138/DIG. 2, DIG. 5, DIG. 7, 131

(56) References Cited

U.S. PATENT DOCUMENTS

| | | | | |
|---|---|---|---|---|
| 3,880,195 A | * | 4/1975 | Goodrich et al. .. | 138/DIG. 5 X |
| 4,173,670 A | * | 11/1979 | VanAuken ......... | 138/DIG. 2 X |
| 4,514,245 A | * | 4/1985 | Chabrier ............ | 138/DIG. 5 X |
| 4,559,974 A | * | 12/1985 | Fawley ........................ | 138/172 |
| 4,971,846 A | * | 11/1990 | Lundy ................ | 138/DIG. 2 X |
| 5,632,307 A | * | 5/1997 | Fawley et al. ............ | 138/97 X |

OTHER PUBLICATIONS

Tensile and Fatigue Behavior of Glassfibre/Epoxy Laminates, F. Ellyin and D. Kujawski, Construction and Building Materials, 1995, vol. 9, No. 6, p. 425–429.

* cited by examiner

Primary Examiner—Patrick Brinson
(74) Attorney, Agent, or Firm—Millen, White, Zelano & Branigan, P.C.

(57) ABSTRACT

A steel liner (a pipe or vessel) is wrapped with a stack of sheets of glass fiber-reinforced epoxy matrix composite arranged in angle-ply pattern. The stack is cured on the liner to bond the sheets together and to the liner. The wrapped liner is then internally pressurized to cause the liner to yield while the composite remains elastic. When de-pressurized, the liner has compressive residual stress and the composite has tensile residual stress. When the resulting hybrid structure is subsequently again pressurized, it is found that the elastic regime of the liner has been extended.

6 Claims, 5 Drawing Sheets

FIBER-REINFORCED COMPOSITE WRAPPED STEEL LINER

FIELD OF THE INVENTION

The present invention relates to a hybrid structure comprising an inner metal liner (selected from the group consisting of pipes and pressure vessels) wrapped with and bonded to an outer layer of fiber-reinforced, cured polymer resin matrix composite. In another aspect the invention relates to a method for producing such a structure.

BACKGROUND OF THE INVENTION

It is known to reinforce a steel liner, such as a pipe or vessel, by wrapping it with a layer of fiber-reinforced, cured polymer resin matrix composite. The product can be referred to as a 'hybrid structure'.

The fibers can be selected from the group consisting of glass, carbon, graphite or aramid. The polymer resin can be selected from the group consisting of epoxy, vinylester, polyester, peek, nylon and polyethlene. The preferred combination is glass or carbon fibers in an epoxy resin matrix.

The hybrid structure can be formed in either of the following ways.

Layers of partially cured, pre-impregnated, fiber-reinforced tape or sheet can be sequentially applied to the liner. The innermost layer is bonded to the steel with structural adhesive. The layers are bonded to each other by a curing resin, positioned between them, which interacts chemically with the layer resin. This technique is disclosed in my published Canadian patent application No. 2,181,497.

An alternative technique involves drawing rovings of fiber through a liquid bath of resin and winding the resin-coated fibers onto the liner to form a wrapping. The wrapping is then cured in place. This technique is described, for example, in U.S. Pat. No. 4,559,974, issued to Fawley.

SUMMARY OF THE INVENTION

The present invention is based on the following discovery:

if a hybrid structure, comprising an inner metal liner, preferably steel, and an outer wrapping of layers of fiber-reinforced, cured polymer resin matrix composite (non-metallic), bonded to the liner and arranged in an angle-ply pattern, is internally pressurized, to cause the steel of the liner to yield while the composite remains elastic, and then is de-pressurized;

it will be found that, in the de-pressurized state, the steel will have a compressive residual stress while the composite wrapping will have a tensile residual stress;

with the result that, when subsequently re-pressurized, the elastic regime (that is, the linear part of the pressure versus strain curve) of the steel liner is extended and the liner will not yield at the previous yield pressure. Thus, it takes greater pressure to burst the steel liner.

This means that a thinner walled pipe or vessel, when wrapped and treated as described, can operate as safely in pressure service as a thicker walled pipe or vessel formed of the same steel. Otherwise stated, a lighter pipe or vessel can be modified to achieve the same pressure rating as a heavier pipe or vessel.

By way of further explanation, if one takes a hybrid pipe or pressure vessel prepared as described and subjects it to increasing internal pressurization, and plots a pressure versus strain curve, the following will be noted:

The curve will ascend linearly and with a steep slope, characteristic of the stiffness of the steel alone, until the point at which the steel yields. Over this interval, both the steel and composite undergo elastic deformation;

After the yield point of the steel, the curve continues ascending generally linearly, but with a lesser slope, characteristic of the composite. Over this interval, there is plastic deformation of the liner and elastic deformation of the composite. The steel now deforms more rapidly;

When the pressure is released, the composite wants to shrink back to its original diameter. However, the liner is now permanently deformed and can only shrink back to a diameter greater than its original diameter. As a result, the composite now is in tension and the steel is in compression.

When the so treated hybrid pipe or vessel is again internally pressurized and the pressure versus strain is plotted, a linear (elastic) response curve is produced up to the previously applied pressure.

By applying the technique of the invention, the fiber reinforced composite shares a substantial part of the applied load. In addition, the fatigue resistance of the hybrid pipe has been found to be improved because for a part of the operating pressure cycle the stress in the steel liner remains compressive. Because of these features, a lighter hybrid pipe treated in accordance with the invention has better mechanical performance than a hybrid pipe that has not been so treated or the liner alone.

In a preferred feature, the angle-ply pattern wrapping is provided in the form of a stack of sheets or layers of fiber-reinforced polymer resin matrix. The sheets are wrapped about the liner in what is referred to as an angle-ply pattern. That is, one sheet or ply is wrapped with its fibers at an angle of $+x°$ relative to the axis of the pipe and the next ply is wrapped with its fibers at an angle of $-y°$ relative to the axis. Most preferably the fibers of the sheets of the stack are arranged on the basis of $+\theta°, -\theta°, +\iota°$. . . The phrase "angle ply pattern" is intended to cover these variants. It is to be understood that the word "wrapping" is to be given a broad connotation. It denotes the cured covering, which may have involved winding sheets, tapes or fibers onto the liner.

The stack is bonded to the liner and the sheets are bonded one to another by curing the stack after it has been wrapped on the liner.

In one aspect the invention is directed to a fiber-reinforced hybrid structure comprising: an inner metal liner selected from the group consisting of pipes and vessels; and an outer wrapping of fiber-reinforced, cured polymer resin matrix composite, said wrapping being wrapped around the liner in an angle-ply pattern and bonded thereto; said structure having been internally pressurized, to cause the metal of the liner to yield while the composite layer remained elastic and then de-pressurized so that the liner has compressive residual stress and the composite layer has tensile residual stress after de-pressurization.

In another aspect the invention is directed to a method for making a reinforced hybrid structure comprising: providing a metal liner selected from the group consisting of pipes and vessels; wrapping the liner with a plurality of plies of uncured or partly-cured fiber-reinforced polymer resin composite arranged in an angle-ply pattern; curing the plies and bonding them to the liner and to one another to produce a wrapped liner; internally pressurizing the wrapped liner to cause the steel of the liner to yield while the composite remains elastic; and then de- pressurizing the wrapped liner to produce a reinforced hybrid structure in which the liner has compressive residual stress and the composite has tensile residual stress.

DESCRIPTION OF THE PREFERRED EMBODIMENT

The invention is illustrated by the following examples.

EXAMPLE 1

A longitudinal seamed steel pipe having an inside diameter of 305 mm (12 inch) and 1.21 mm (0.0476 inch) wall thickness was used in this test. The yield stress of the pipe steel was known to be 180 MPa (26,000 psi). According to accepted design practice, the maximum operation pressure (MOP) of this pipe was 0.714 MPa (104 psi). The MOP equates with half of the expected yield pressure.

The pipe was prepared by sand blasting its surface and washing it with acetone, to clean it.

Multiple (14) layers of partly cured ("pre-preg") fiber glass-reinforced epoxy composite were cut from a pre-preg sheet roll, available from 3M under the designation 3M-type 1003 E-glass fiber/epoxy resin. The layers were cut using a template and sharp scalpel blade. The templates were made from a high quality metal sheet to length and shape which depend on the pipe dimensions (external diameter and length) and fiber direction wrap angle. The procedure was as follows.

The pre-preg roll was laid on a flat surface working table, which was overlaid with a plastic sheet on which two longitudinal guides were fixed. All surfaces were thoroughly cleaned by acetone and wiped out. The pre-preg sheet roll was laid on the table and cut using the template scalpel blade. Individual layers thus cut were properly positioned relative to the guide with the pre-preg backing paper facing the top, and the lower surface lightly sticking on the plastic overlay; and using a flat heavy block, trapped air was squeezed out by moving the block on the backing paper. Following this, the backing paper was gently peeled off from the end closer to the pipe on to which it was to be wrapped. squeezed out by moving the block on the backing paper. Following this, the backing paper was gently peeled off from the end closer to the pipe on to which it was to be wrapped.

Figure 8:
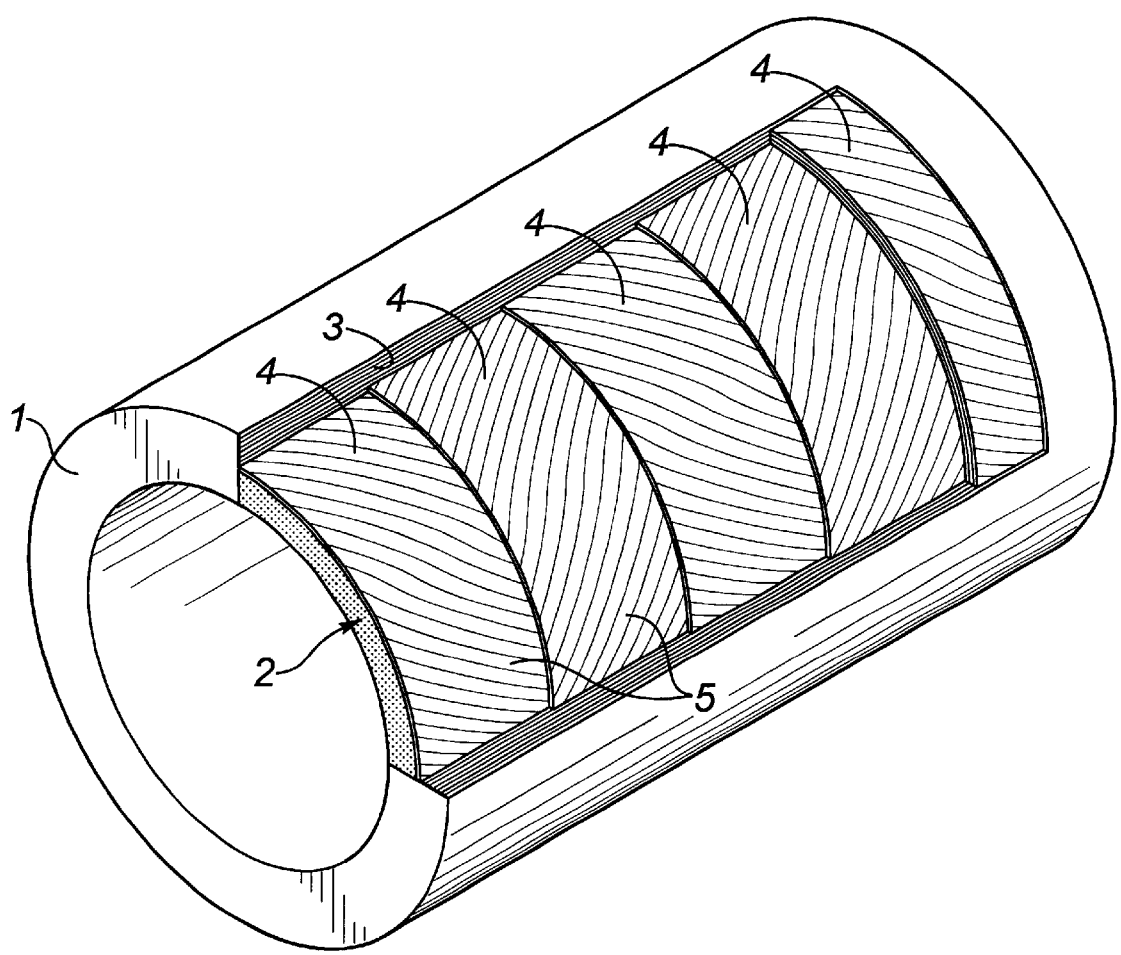
FIG. 8 is a perspective, partly cut away view of a liner wrapped with a plurality of layers or plies in an angle-ply pattern.

FIG. 8 is a perspective, partly cut away view of a liner wrapped with a plurality of layers or plies in an angle-ply pattern.

As shown in FIG. 8, the hybrid structure 1, shown as a wrapped pipe, comprises a steel liner 2 wrapped in a stack 3 of sheets 4 of cured epoxy resin containing reinforcing fibers 5 of glass, the sheets 4 being arranged in an angle-ply pattern.

The steel pipe liner was then rolled along a guide as the peeling proceeded. The pre-preg stuck on the pipe surface and the first layer was thus wrapped on the steel liner. The hybrid pipe was then rolled several times on the table while applying small pressure to ensure that no air remained trapped in between the layer and the steel liner. Prior to applying the next layer, the table surface and the guide were thoroughly cleaned with acetone, and the layer was applied in an alternating angle ply pattern. In this example, the ply angles were ±70° relative to the axis of the pipe. Fourteen layers were wrapped in the above described manner.

A nylon release peel ply-fabric (E4760 Non-perforated, available from Northern Fiber Glass Sales Inc., Alberta) was then wrapped on the exterior surface of the pipe. Finally, a shrink tape (Oriented Polyester Tape) was wrapped on the fabric. The two extremities of the pipe were then sealed by using a high temperature tape.

The pipe thus wrapped was then placed in an oven and heated to 149° C. (300° F.) for 12 hours to cure the composite and consolidate the pre-preg layers. Upon cooling, the shrink tape and release peel ply fabric were removed. The final thickness of the wrapped glass fiber epoxy resin layers was 3.5 mm (0.138 inch).

The cured wrapped pipe was subsequently placed in a device to apply an internal pressure. This device consisted of an inner thick-walled cylinder, two end flanges and a rubber bladder. The space between the thick-walled cylinder and the rubber bladder was filled with oil and then pressurized. The thick-cylinder was attached to the end flanges and sealed by o-rings so no oil could penetrate inside.

The pressurized rubber bladder transmitted pressure to the inner wall of the hybrid pipe. The axial pressure force on the two flanges was transferred directly to the inner thick-walled cylinder. In this manner, the hybrid pipe was subjected to a pure hoop stress with negligible axial stress. The pipe was instrumented by placing a strain gauge in the hoop direction at its mid length.

Figure 1:
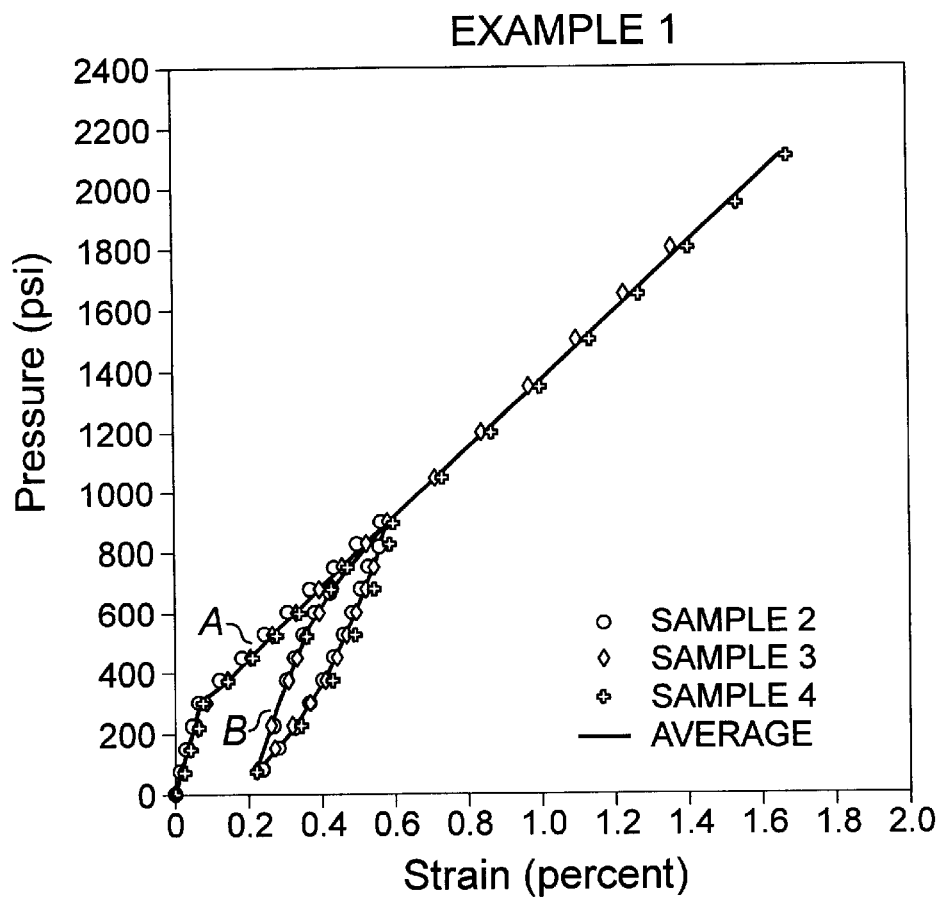
FIG. 1 is a set of stress-strain curves based on the results of Example 1.

The hybrid pipe was tested by gradually increasing the internal pressure. As shown in FIG. 1, curve a, all three wrapped pipe samples yielded at a pressure of about 2.1 MPa (300 psi). At this pressure the slope of the curve changed as the fiber glass wrap carried a larger proportion of the pressure load. The pressure was increased to about 6.2 MPa (900 psi) after which the pipe was de-pressurized to about 0.35 MPA (50 psi). Note that at this pressure there exists a residual strain of about 0.2 percent, that is, the inner steel liner is plastically deformed (permanent deformation).

The pipe was then again pressurized and as shown by curve b, no yielding was observed up to 4.1 MPa (600 psi) and no failure (burst) occurred when the pressure was increased as high as 14.5 MPa (2100 psi). Note that FIG. 1 shows the data points for three samples with negligible deviations from one test to another. Table 1 summarizes the improved performance of the hybrid pipe, relative to a non-reinforced steel pipe. Due to glass fiber epoxy resin reinforcement and the described procedure of inducing residual compressive stresses in the steel pipe, the yield pressure of the hybrid pipe was increased by about three folds and the burst pressure by more than six times.

TABLE 1 a) THIN-WALLED STEEL PIPE

| | |
|---|---|
| Internal Diameter | 305 mm (12 inches) |
| Longitudinal Seamed Steel Pipe Thickness | 1.21 mm (0.0476 inch) |
| Weight per Unit Length | 9.08 kg/m (6.10 lb/foot) |
| Yield Pressure | 1.45 MPa (210 psi) |

TABLE 2

HYBRID STEEL/GLASS FIBER REINFORCED PIPE

| | |
|---|---|
| Internal Diameter | 305 mm (12 inches) |
| Seamed Steel Pipe Thickness | 1.21 mm (0.0476 inch) |
| Composite Wrap Thickness | 3.5 mm (0.138 inch) |
| Weight per Unit Length | 15.3 kg/m (10.3 lb/foot) |
| Yield Pressure | 4.1 MPa (600 psi) |
| Failure Pressure | >14.5 MPa (2,100 psi) |

EXAMPLE 2

A standard 4 inch gas pipeline (NPS-4) designed according to present codes for a maximum operating pressure (MOP) of 8,450 kPa (1,225 psi) will result in a pipe having the following dimensions: the nominal inside diameter with be 102 mm (4 in.) and the wall thickness will be 6 mm (0.24 in.) when the pipe is made of grade 241 steel (ASTM A333 grade G seamless).

Test Pipe

Figure 2:
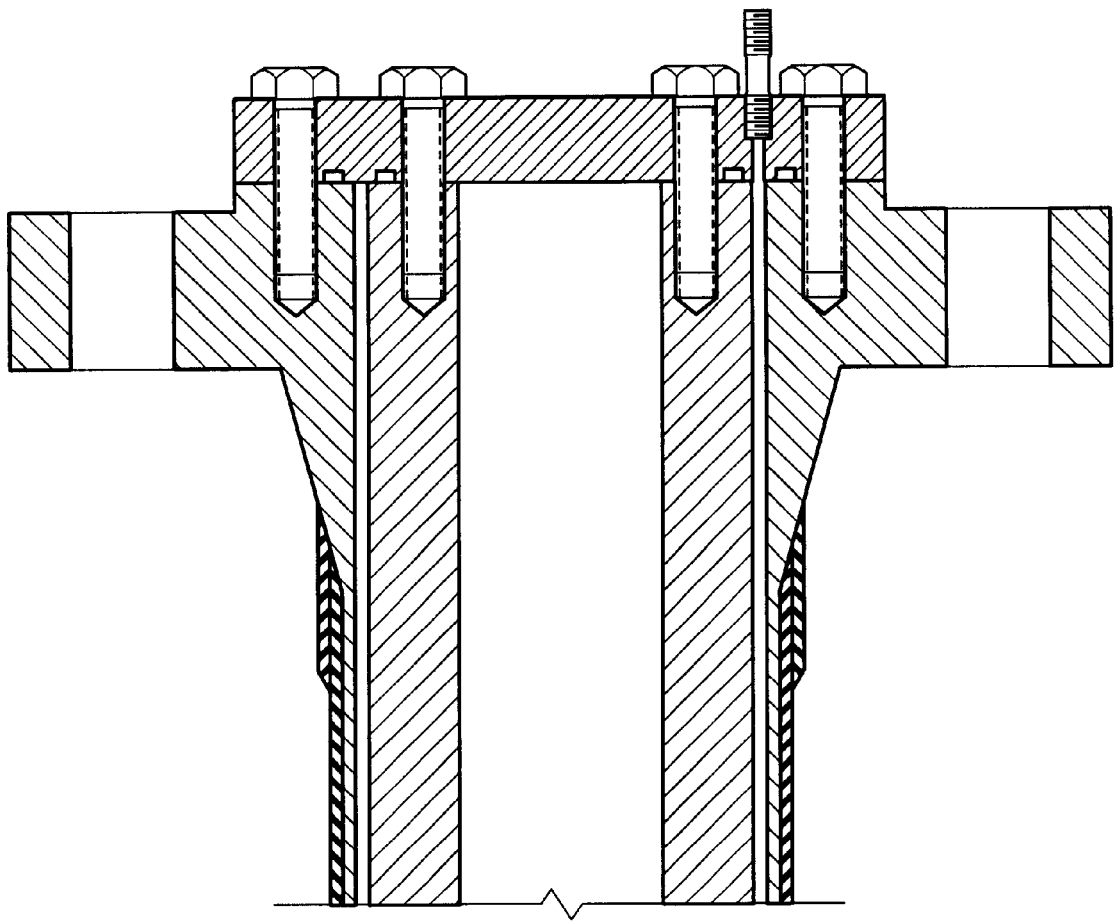
FIG. 2 is a sectional side view of the test assembly used to carry out the test of Example 1.

A test pipe, formed of grade 241 steel and having 102 mm (4 in.) inside diameter and wall thickness of 3 mm (0.12 in.) was welded to a flange in both ends as shown in drawing FIG. 2. The pipe was then wrapped with 12 layers of 3M-type 1003 E-glass/epoxy resin and cured in accordance with the procedure of Example 1, to provide a glass-reinforced composite wrap having a thickness of 3 mm (0.12 in.).

The resulting hybrid pipe was then internally hydraulically pressurized. (Note that an internal thick-walled pipe is inserted inside the hybrid pipe, similar to Example 1, to take the axial pressure load.)

Test Run #1

Figure 3:
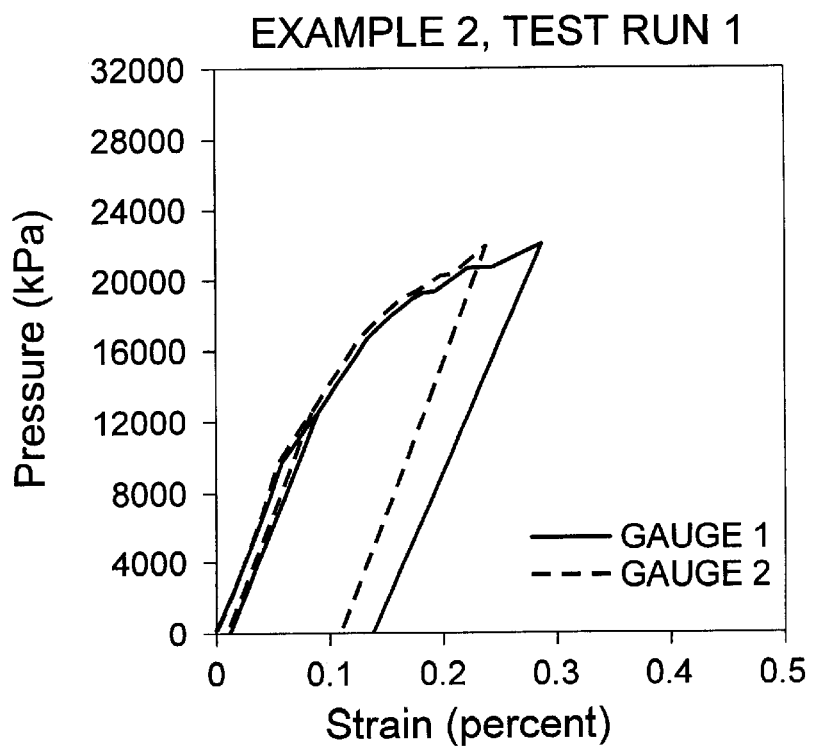
FIG. 3 is a set of stress-strain curves based on the results of test run #1 of Example 2.

The hybrid pipe was tested by gradually increasing pressure, as shown in FIG. 3. The steel liner yielded at about 9,522 kPa (1,380 psi). The average slope of $\Delta P/\Delta \epsilon$ in the elastic range was 16,700 MPa ($2.42 \times 10^6$ psi) (average value from two strain gauge readings). The pressure was then increased to 19,320 kPa (2,800 psi) and held for 15 minutes with no creep being observed. The pressure was finally increased to 22,080 kPa (3,200 psi), that is by a factor of more than 2.3 times the yield pressure of the steel liner.

The pressure was then bled off to zero. Note that there was a residual strain of about 0.14%.

Test Run #2

Figure 4:
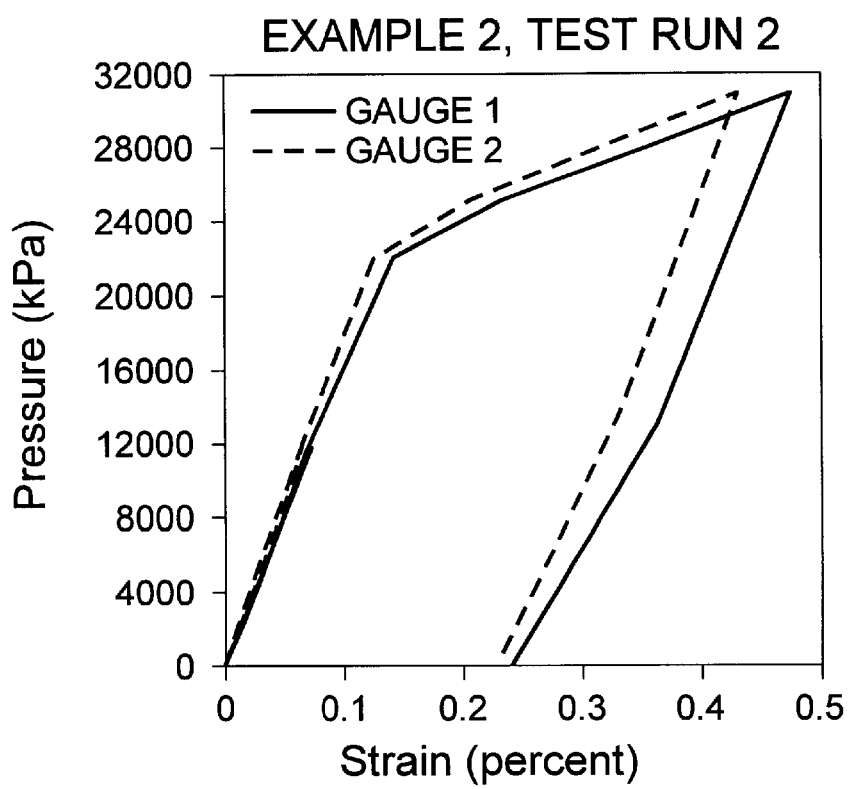
FIG. 4 is a set of stress-strain curves based on the results of test run #2 of Example 2.

The hybrid pipe was then again subjected to increasing internal pressure. As seen in FIG. 4, the yield pressure this time was about 22,000 kPa (3,190 psi) close to the previous maximum pressure. This increased yield pressure was due to the compressive residual stresses induced in the first loading, FIG. 3. The average slope of $\Delta P/\Delta \epsilon$ in the elastic range was 17,250 MPa ($2.5 \times 10^6$ psi). At a pressure of 30,950 kPa, that is, 3.66 times its maximum operating pressure, the hybrid pipe still did not burst. A steel pipe of the same thickness, that is, NPS4 pipe would have already burst.

Test Run #3

Figure 5:
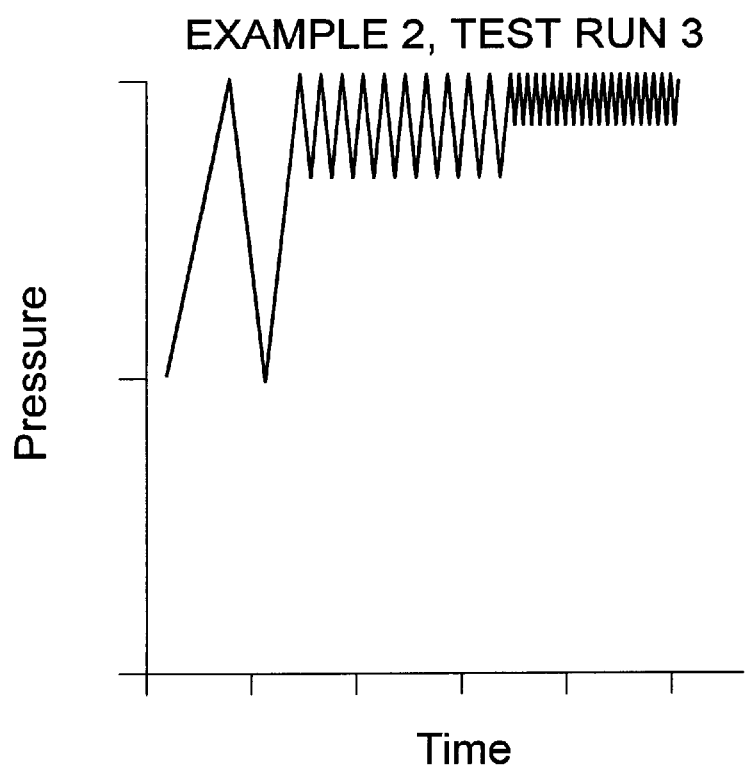
FIG. 5 is a curve showing the cyclic pressure spectrum of test run #3 of Example 2.

Furthermore, the hybrid pipe was subjected to a block of cyclic pressure spectrum as shown in FIG. 5. This block containing 31 cycles with a maximum pressure of 6,200 kPa (900 psi) was extracted from the recorded pipeline pressure fluctuation spectrum. The test was run for 13, 200 blocks, equivalent to 200 years of operation. The slope of $\Delta P/\Delta \epsilon$ was measured at several time intervals; it remained almost constant and was about 16,600 kPa ($2.4 \times 10^6$ psi).

Figure 6:
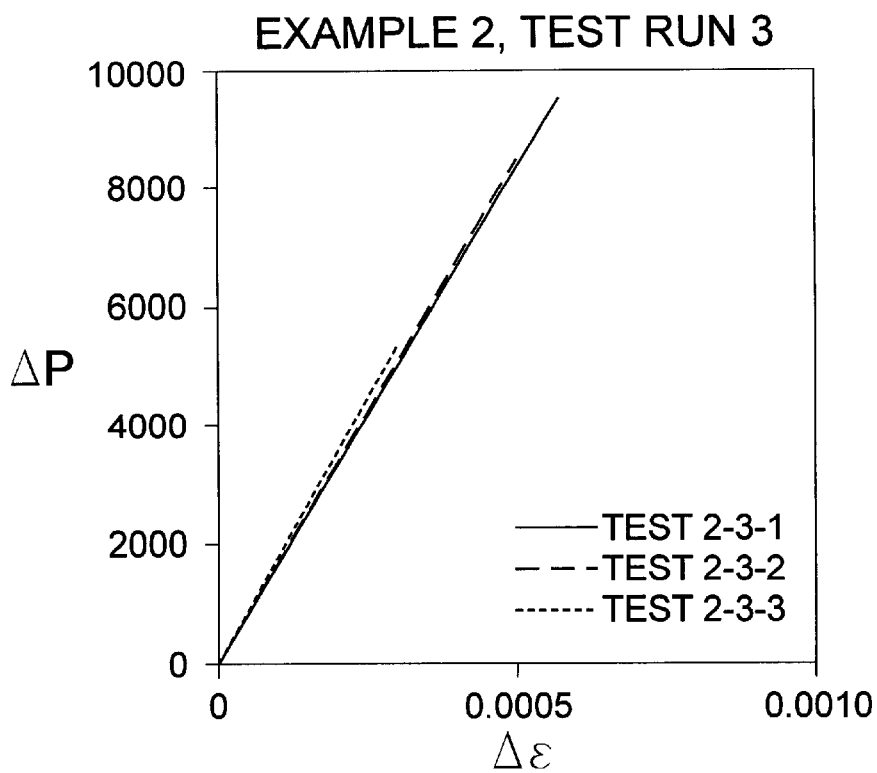
FIG. 6 is a set of curves showing the slope of $\Delta P/\Delta \epsilon$ for three runs reported in Example 2.

FIG. 6 shows the slope of $\Delta P/\Delta \epsilon$ for the three different test histories, showing a constant value indicative of no damage being sustained by the hybrid pipe.

EXAMPLE 3

A hybrid pipe prepared as in EXAMPLE 1, was subjected to different pressure histories as follows:

Test Run #1

Figure 7:
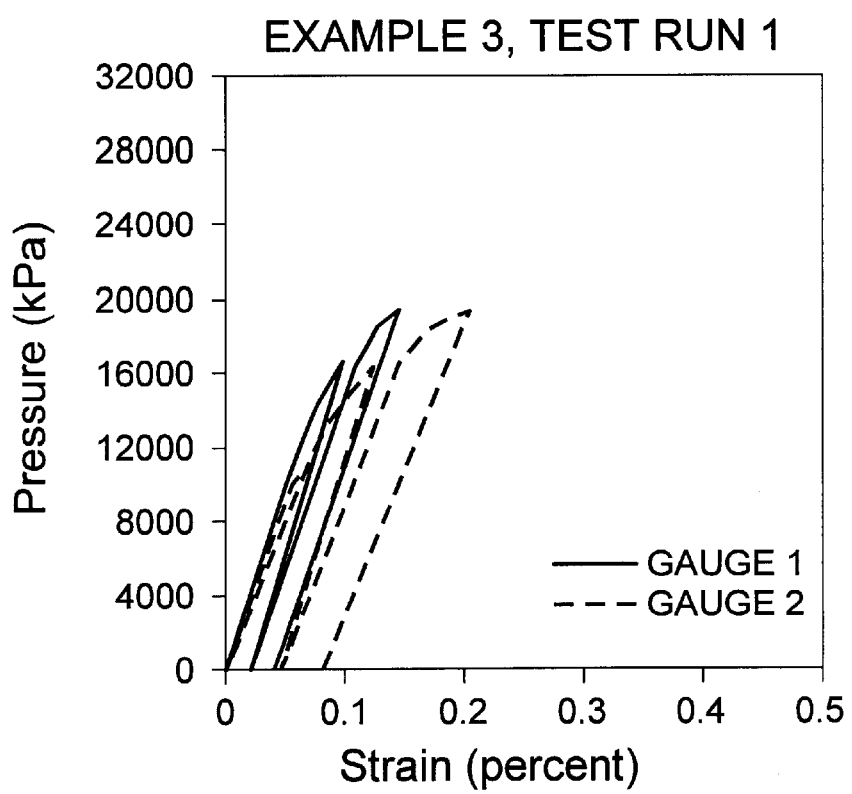
FIG. 7 is a set of stress-strain curves based on the results of Example 3.

The hydraulic fluid in the pipe was pressurized gradually up to 11,850 kPa (1,720 psi) held for 15 minutes and de-pressurized. Neither creep strain at the hold pressure nor residual strain at the zero pressure was observed. The pipe was again pressurized to 16,500 kPa (2,390 psi), and de pressurized. Yielding of steel liner was observed at about 15,000 kPa (2,175 psi) and the residual strain was less than 0.05% as shown in FIG. 7. The final step was to pressurized the hybrid pipe to a maximum pressure of 19,500 kPa (2,830 psi), that is, 2.3 times its maximum operating pressure. FIG. 7 shows the pressure versus hop strain for the above pressurization history. The average slope of $\Delta P/\Delta \epsilon$ in the elastic range was 17,800 MPa ($2.58 \times 10^6$ psi).

Test Run #2

The hybrid pipe of test run #1 (Example 3) was connected to a main gas line loop for 42 days. The pipe was thus subjected to the actual pressure loading in a gas transport main line, as well as pulsation tests. The latter consisted of a week (4–5 hours/day) at a line pressure of about 5,000 kPa (725 psi) with a frequency of 10–50 Hz and a peak pulsation increment of 100 kPa (15 psi). After 42 days of testing program described above, the hybrid pipe stiffness was measured, $\Delta P/\Delta \epsilon = 17,150$ MPa ($2.49 \times 10^6$ psi).

It is seen from this example that the hybrid pipe performance is quite remarkable under both laboratory tests Run #1 and actual field tests, Run #2. The stiffness measurement also indicates that the pipe did not sustain any damage.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, are hereby incorporated by reference in their entirety.

From the foregoing description, one skilled in the art can easily ascertain the essential characteristics of this invention, and can make various changes and modifications of the invention to adapt it to various usages and conditions.

The embodiments of the invention in which an exclusive property or privilege is clamed are defined as follows:

1. A fiber-reinforced hybrid structure comprising:
   an inner metal liner selected from the group consisting of pipes and vessels; and
   an outer wrapping of layers of fiber-reinforced, cured polymer resin matrix composite, said layers being wrapped around the liner in an angle-ply pattern and bonded to each other and the liner;
   said structure having been internally pressurized to cause the steel of the liner to yield while the composite wrapping remained elastic and then de-pressurized so that the liner has compressive residual stress and the composite wrapping has tensile residual stress after de-pressurization.

2. The hybrid structure as set forth in claim 1 wherein:

the fibers of the composite are selected from the group consisting of glass, carbon, graphite or aramid fibers; and the resin of the composite is selected from the group consisting of epoxy, vinylester, polyester, peek, nylon or polyethylene.

3. The hybrid structure as set forth in claim 1 wherein:

the liner is formed of steel;

the fibers are glass fibers; and the resin is epoxy.

4. A method for making a reinforced hybrid structure comprising: providing a steel liner selected from the group consisting of pipes and vessels;

wrapping the liner with a plurality of plies of uncured or partly-cured fiber-reinforced polymer resin composite arranged in an angle-ply pattern;

curing the plies and bonding them to the liner and to one another to produce a wrapped liner;

internally pressurizing the wrapped liner to cause the steel of the liner to yield while the composite remains elastic; and then de-pressurizing the wrapped liner to produce a reinforced hybrid structure in which the liner has compressive stress and the composite has tensile residual stress.

5. The method as set forth in claim 4 wherein:

the fibers of the composite are selected from the group consisting of glass, carbon, graphite or aramid fibers; and the resin of the composite is selected from the group consisting of epoxy, vinylester, polyester, peek, nylon or polyethylene.

6. The method as set forth in claim 4 wherein:

the fibers are glass fibers; and the resin is epoxy.

* * * * *